(12) United States Patent
Boyd (10) Patent No.: US 8,667,184 B2
(45) Date of Patent: *Mar. 4, 2014

(54) DISTRIBUTED KERNEL OPERATING SYSTEM

(75) Inventor: Andrew Boyd, Merrickville (CA)

(73) Assignee: QNX Software Systems Limited, Kanata, Ontario (CA)

( * ) Notice: Subject to any disclaimer, the term of this patent is extended or adjusted under 35 U.S.C. 154(b) by 1460 days.

This patent is subject to a terminal disclaimer.

(21) Appl. No.: 11/144,327

(22) Filed: Jun. 3, 2005

(65) Prior Publication Data

US 2006/0277284 A1 Dec. 7, 2006

(51) Int. Cl.
*G06F 15/16* (2006.01)
(52) U.S. Cl.
USPC .............................. 709/250; 709/238; 709/239
(58) Field of Classification Search
USPC .......................................... 703/250, 238, 239
See application file for complete search history.

(56) References Cited

U.S. PATENT DOCUMENTS

| | | | |
|---|---|---|---|
| 4,887,204 A | 12/1989 | Johnson et al. |
| 4,897,781 A | 1/1990 | Chang et al. |
| 5,253,342 A | 10/1993 | Blount et al. |
| 5,410,709 A | 4/1995 | Yu |
| 5,428,803 A | 6/1995 | Chen et al. |
| 5,442,785 A | 8/1995 | Roffe et al. |
| 5,452,447 A | 9/1995 | Nelson et al. |
| 5,548,760 A | 8/1996 | Healey |
| 5,566,302 A | 10/1996 | Khalidi et al. |
| 5,566,337 A | 10/1996 | Szymanski et al. |
| 5,574,903 A | 11/1996 | Szymanski et al. |
| 5,577,251 A | 11/1996 | Hamilton et al. |
| 5,581,705 A | 12/1996 | Passint et al. |
| 5,590,334 A | 12/1996 | Saulpaugh et al. |
| 5,617,568 A | 4/1997 | Ault et al. |
| 5,634,068 A | 5/1997 | Nishtala et al. |
| 5,644,719 A | 7/1997 | Aridas et al. |
| 5,652,885 A | 7/1997 | Reed et al. |
| 5,675,795 A | 10/1997 | Rawson, III et al. |
| 5,694,600 A | 12/1997 | Khenson et al. |

(Continued)

FOREIGN PATENT DOCUMENTS

EP 1 011 244 A2 6/2000
EP 1 452 972 A1 9/2004

(Continued)

OTHER PUBLICATIONS

European Search Report dated Jun. 1, 2007, for corresponding Application No. EP 06 01 0760.

(Continued)

*Primary Examiner* — Nicholas Taylor
(74) *Attorney, Agent, or Firm* — Brinks Gilson & Lione (57) ABSTRACT

An improved distributed operating system over a network of computer systems is described. Existing distributed operating systems have transmission performance limitations dictated by their inability to (1) reliably handle transient communication failures and rapid node reboots, (2) provide a transmission protocol that adapts to link reliability, and (3) allow transmissions to occur over an arbitrary combination of communication links. The systems and methods described herein solve these problems by providing a reliable node-to-node session protocol that offers high performance message delivery and multi-interface management and support. This is done by transmitting all data between two nodes of the operating system over a single connection that may dynamically exploit multiple interfaces between the nodes.

14 Claims, 8 Drawing Sheets

(56) References Cited

U.S. PATENT DOCUMENTS

| | | | |
|---|---|---|---|
| 5,734,898 A | 3/1998 | He | |
| 5,734,903 A | 3/1998 | Saulpaugh et al. | |
| 5,745,759 A | 4/1998 | Hayden et al. | |
| 5,764,897 A | 6/1998 | Khalidi | |
| 5,768,511 A | 6/1998 | Galvin et al. | |
| 5,787,251 A | 7/1998 | Hamilton et al. | |
| 5,790,530 A | 8/1998 | Moh et al. | |
| 5,790,804 A | 8/1998 | Osborne | |
| 5,802,288 A | 9/1998 | Ekanadham et al. | |
| 5,978,912 A | 11/1999 | Rakavy et al. | |
| 5,991,820 A | 11/1999 | Dean | |
| 6,006,283 A | 12/1999 | Hsiech et al. | |
| 6,047,323 A | 4/2000 | Krause | |
| 6,049,838 A | 4/2000 | Miller et al. | |
| 6,061,740 A | 5/2000 | Ferguson et al. | |
| 6,064,671 A | 5/2000 | Killian | |
| 6,131,126 A | 10/2000 | Kougiouris et al. | |
| 6,157,961 A | 12/2000 | Kessler et al. | |
| 6,167,430 A * | 12/2000 | Lurndal | 709/203 |
| 6,226,689 B1 | 5/2001 | Shah et al. | |
| 6,272,629 B1 | 8/2001 | Stewart | |
| 6,321,279 B1 | 11/2001 | Bonola | |
| 6,353,885 B1 | 3/2002 | Herzi et al. | |
| 6,356,904 B1 | 3/2002 | Moriyama | |
| 6,385,659 B1 | 5/2002 | Tuel, Jr. | |
| 6,393,497 B1 | 5/2002 | Arnold et al. | |
| 6,412,018 B1 | 6/2002 | Tuel, Jr. | |
| 6,415,332 B1 | 7/2002 | Tuel, Jr. | |
| 6,434,459 B2 | 8/2002 | Wong et al. | |
| 6,446,070 B1 | 9/2002 | Arnold et al. | |
| 6,466,947 B2 | 10/2002 | Arnold et al. | |
| 6,466,996 B1 | 10/2002 | Bonola | |
| 6,487,455 B1 * | 11/2002 | Balasubramanian | 700/2 |
| 6,487,598 B1 | 11/2002 | Valencia | |
| 6,487,607 B1 | 11/2002 | Wollrath et al. | |
| 6,513,049 B1 | 1/2003 | Moriyama | |
| 6,519,594 B1 | 2/2003 | Li | |
| 6,643,650 B1 | 11/2003 | Slaughter et al. | |
| 6,647,423 B2 | 11/2003 | Regnier et al. | |
| 6,697,876 B1 * | 2/2004 | van der Veen et al. | 719/313 |
| 6,728,722 B1 | 4/2004 | Shaylor | |
| 6,731,601 B1 | 5/2004 | Krishna et al. | |
| 6,748,452 B1 | 6/2004 | Elphinstone et al. | |
| 6,757,745 B1 | 6/2004 | Hamann et al. | |
| 6,757,903 B1 | 6/2004 | Havemose | |
| 6,757,904 B1 | 6/2004 | Woodruff et al. | |
| 6,785,892 B1 | 8/2004 | Miller et al. | |
| 6,789,077 B1 | 9/2004 | Slaughter et al. | |
| 6,789,126 B1 | 9/2004 | Saulpaugh et al. | |
| 6,792,466 B1 | 9/2004 | Saulpaugh et al. | |
| 6,807,564 B1 | 10/2004 | Zellner et al. | |
| 6,847,618 B2 | 1/2005 | Laursen et al. | |
| 6,850,979 B1 | 2/2005 | Saulpaugh et al. | |
| 6,938,152 B2 | 8/2005 | Shin et al. | |
| 6,947,417 B2 | 9/2005 | Laursen et al. | |
| 6,959,264 B2 | 10/2005 | Mandal | |
| 6,981,055 B1 * | 12/2005 | Ahuja et al. | 709/238 |
| 6,981,244 B1 | 12/2005 | Kathail et al. | |
| 6,985,951 B2 | 1/2006 | Kubala et al. | |
| 6,993,746 B2 | 1/2006 | Hue | |
| 7,000,075 B2 | 2/2006 | Beckert et al. | |
| 7,016,348 B2 | 3/2006 | Laursen et al. | |
| 7,036,040 B2 | 4/2006 | Nicholson et al. | |
| 7,051,160 B2 | 5/2006 | Beckert et al. | |
| 7,051,326 B2 | 5/2006 | Goodman | |
| 7,058,955 B2 | 6/2006 | Porkka | |
| 7,133,929 B1 * | 11/2006 | Shah | 709/241 |
| 7,161,939 B2 | 1/2007 | Israel et al. | |
| 7,174,447 B2 | 2/2007 | Zimmer et al. | |
| 7,724,671 B2 | 5/2010 | Midtun et al. | |
| 2002/0062437 A1 | 5/2002 | Shin et al. | |
| 2002/0069302 A1 | 6/2002 | Porkka | |
| 2002/0129172 A1 | 9/2002 | Baskey et al. | |
| 2002/0147785 A1 | 10/2002 | Venkatsubramanian et al. | |
| 2002/0156897 A1 | 10/2002 | Chintalapati et al. | |
| 2002/0161848 A1 | 10/2002 | Willman et al. | |
| 2003/0002448 A1 | 1/2003 | Laursen et al. | |
| 2003/0002477 A1 | 1/2003 | Israel et al. | |
| 2003/0002481 A1 | 1/2003 | Laursen et al. | |
| 2003/0033427 A1 | 2/2003 | Brahmaroutu | |
| 2003/0041096 A1 | 2/2003 | Johnson | |
| 2003/0043782 A1 | 3/2003 | Laursen et al. | |
| 2003/0097581 A1 | 5/2003 | Zimmer | |
| 2003/0107996 A1 | 6/2003 | Black et al. | |
| 2003/0115366 A1 | 6/2003 | Robinson | |
| 2003/0236813 A1 | 12/2003 | Abjanic | |
| 2004/0019680 A1 * | 1/2004 | Chao et al. | 709/226 |
| 2004/0078543 A1 | 4/2004 | Koning et al. | |
| 2004/0083317 A1 | 4/2004 | Dickson et al. | |
| 2004/0093489 A1 | 5/2004 | Hsu | |
| 2004/0128201 A1 | 7/2004 | Ofir et al. | |
| 2004/0143696 A1 | 7/2004 | Hsieh | |
| 2004/0216135 A1 | 10/2004 | Heimbeck | |
| 2004/0228279 A1 | 11/2004 | Midtun et al. | |
| 2004/0236567 A1 | 11/2004 | Rothman et al. | |
| 2004/0260919 A1 | 12/2004 | Takahashi | |
| 2005/0008017 A1 * | 1/2005 | Datta et al. | 370/392 |
| 2005/0044151 A1 | 2/2005 | Jiang et al. | |
| 2005/0120117 A1 * | 6/2005 | Burckart et al. | 709/227 |
| 2005/0149601 A1 | 7/2005 | Cox et al. | |
| 2005/0201272 A1 | 9/2005 | Wang et al. | |
| 2005/0229042 A1 | 10/2005 | Crowell et al. | |
| 2005/0259671 A1 | 11/2005 | Jung et al. | |
| 2005/0268300 A1 | 12/2005 | Lamb et al. | |
| 2006/0047875 A1 | 3/2006 | Aguilar, Jr. et al. | |
| 2006/0095724 A1 | 5/2006 | Singh | |
| 2006/0106995 A1 | 5/2006 | Shen | |
| 2006/0150200 A1 | 7/2006 | Cohen et al. | |
| 2006/0182137 A1 | 8/2006 | Zhou et al. | |
| 2006/0227703 A1 * | 10/2006 | Hung et al. | 370/217 |
| 2006/0259671 A1 | 11/2006 | Swartzentruber | |
| 2006/0277285 A1 | 12/2006 | Boyd | |
| 2006/0277400 A1 | 12/2006 | Veen et al. | |
| 2006/0282654 A1 | 12/2006 | Veen et al. | |
| 2007/0097881 A1 | 5/2007 | Jenkins et al. | |

FOREIGN PATENT DOCUMENTS

| | | |
|---|---|---|
| EP | 1 517 575 A2 | 3/2005 |
| KR | 10-2000-0008628 | 2/2000 |
| WO | WO 00/24205 | 4/2000 |
| WO | WO 01/28179 A2 | 4/2001 |
| WO | WO 03/017601 | 2/2003 |

OTHER PUBLICATIONS

McKenny, M. et al., "Transporting multiple classes of traffic over a generic routing device—An investigation into the performance of the RapidIO™ interconnect architecture," 2003 IEEE, pp. 39-44.

Stress, H., "Abschied vom Bus: RapidIO," *Electronik*, vol. 49, No. 24, Nov. 28, 2000, pp. 52-55.

"Interprocess Communication," printed from the internet on Aug. 21, 1998, at <http://www-dsg.standford.edu/papers/cachekernel/subsection3_3_2.html>, 4 pages.

Hollingsworth, J. K. et al., "Dynamic Instrumentation API (proposed) Revision 0.1," printed from the internet on Aug. 18, 1998, at <http://www.cs.wisc.edu/~paradyn/dyninstAPI.html>, 9 pages.

SOLID Server FAQ, printed from the internet on Aug. 18, 1998 at <http://www.solidtech.com/support/faq.htm>, 15 pages.

Toomey, W., "Lecture—Interprocess Communication (IPC) and Synchronisation," printed from the internet on Aug. 21, 1998, at <http://www.cs.adfa.oz.au/teaching/studinfo/csa2/OSNotes/node12.html>, 4 pages.

von Eicken, T. et al., "U-Net: A User-Level Network Interface for Parallel and Distributed Computing," Department of Computer Science, Cornell University, 1995, pp. 1-14.

Welsh, M. et al., "Incorporating Memory Management Into User-Level Network Interfaces," Department of Computer Science, Cornell University, 1997, pp. 1-10.

Welsh, M. et al., "Shared-Memory Multiprocessor Support for Split-C," printed from the internet on Aug. 20, 1998, at <http://www.cs.berkeley.edu/~mdw/p . . . lit-c-smp/design/split-c-smp.html>, 10 pages.

(56) References Cited

OTHER PUBLICATIONS

State Intellectual Property Office of the People's Republic of China; Text of the First Office Action; Application No. 200610088515.7, dated Nov. 2, 2011, 11 pages.
Canadian Office Action regarding CA Application 2,547,880, dated Sep. 5, 2012.
European Search Report dated Dec. 20, 2006 for corresponding European Application No. 06 021 843.5, 13 pages.
European Search Report dated Jan. 2, 2007 for European Application No. 06 021 843.5, 9 pages.
Newton, H., "Newton's Telecom Dictionary," CMPL Books, 18 ed., Feb. 2002, pp. 216, 390, and 414.
Office Action dated Sep. 5, 2012 for corresponding Canadian Application No. 2,547,880, 3 pages.
Office Action dated Jul. 27, 2011 for corresponding Chinese Application No. 200610088516.1, 9 pages.
Office Action dated Nov. 2, 2011 for corresponding Chinese Application No. 200610088516.1, 12 pages.
Office Action dated May 31, 2013 for corresponding Korean Application No. 10-2006-0049352, 7 pages.
Office Action dated Oct. 22, 2012 for corresponding Korean Application No. 10-2006-0049352, 8 pages.
Office Action dated Mar. 20, 2013 for corresponding Canadian Application No. 2,547,829, 4 pages.
Office Action dated Nov. 2, 2011 for corresponding Chinese Application No. 200610088515.7, 14 pages.
Office Action dated Jan. 25, 2013 for corresponding Chinese Application No. 200610088515.7, 12 pages.
Office Action dated Apr. 11, 2013 for corresponding Chinese Application No. 200610088515.7, 9 pages.
Rejection Decision dated Apr. 6, 2012 for corresponding Chinese Application No. 200610088515.7, 12 pages.
Office Action dated Oct. 22, 2012 for corresponding Korean Application No. 10-2006-0049351, 8 pages.
Office Action dated May 24, 2013 for corresponding Korean Application No. 10-2006-0049351, 10 pages.
Office Action dated Feb. 23, 2011 for corresponding Canadian Application No. 2,548,509, 5 pages.
Office Action dated Sep. 9, 2009 for corresponding European Application No. 06011406.3, 1 page.
Office Action dated Oct. 29, 2012 for corresponding Korean Application No. 10-2006-0049348, 11 pages.
Office Action dated Jun. 26, 2007 for corresponding Korean Application No. 10-2006-0102205, 4 pages.
Office Action dated Jun. 3, 2009 for corresponding Canadian Application No. 2,564,573, 5 pages.
Office Action dated Sep. 1, 2010 for corresponding Indian Application No. 1932/CHE/2006, 2 pages.

* cited by examiner

DISTRIBUTED KERNEL OPERATING SYSTEM

BACKGROUND OF THE INVENTION

1. Technical Field

The present invention relates generally to networks of computer systems, and more specifically, to a distributed operating system over a network of computer systems.

2. Related Art

An operating system (OS) is system software responsible for the control and management of computer resources. A typical OS enables communication between application software and the hardware of a computer. The OS allows applications to access the hardware and basic system operations of a computer, such as disk access, memory management, task scheduling, and user interfacing. Additionally, an OS is also responsible for providing network connectivity.

Computer networking provides a mechanism for sharing files and peripheral devices among several interconnected computers. Ideally, a computer network should allow all computers and applications to have access to all the resources of the network, optimizing the collective resources. To achieve this result, distributed operating systems have been developed. A typical distributed OS, however, suffers a variety of limitations. First, a distributed OS may be as a multi-layered system: one layer for the local environment, and a separate layer for the network environment. This results in two different operating systems having to be learned by developers and users. In addition, because the interfaces with the local and network layers are significantly different, an application program may be written to operate on one layer or the other, but can not be written to operate on both. That is, network versions of application programs may not run on individual computers and stand-alone versions may not run on networks.

Additionally, network software handles client computers and servers as different machines. If a user wishes to have a central computer provide files to a number of remote computers, then the central computer must be designated as a server, and the remote computers as clients. This may limit the flexibility of the network, because server and client computers are given different abilities by the operating system. For example, it may not be possible for two computers to share files with one another because one must be designated as the server, and the other the client. Generally the server may not access files stored on the client.

Computer network systems have been designed and optimized to handle a specified set of resources and configurations. For example, a mainframe computer system may comprise a mainframe computer with a large memory storage area and set of printers. Smaller terminals or computers may access this mainframe as clients in a manner specific to the network and software. Such a computer system may not have the flexibility to exploit communication developments as the Internet.

Message passing distributed operating systems have been developed to overcome these problems. An exemplary message passing operating system is described in U.S. Pat. No. 6,697,876 to van der Veen, et al. ("van der Veen et al."), the disclosure of which is herein incorporated by reference. van der Veen et al. describes a distributed operating system with a single level architecture that may be applied to a flexible network environment, including an internet communication link, and to a stand-alone computer. This is done by use of a message passing operating system, and by sending off-node messages to network managers that are capable of directing and receiving the off-node messages.

In addition, interprocess control (IPC) in these systems should be reliable. Unfortunately, some prior distributed operating systems suffer transmission performance limitations dictated by their inability to (1) reliably handle transient communication failures and rapid node reboots, (2) provide a transmission protocol that adapts to link reliability, and (3) allow transmissions to occur over an arbitrary combination of media. Because nodes often may be connected through third party communication networks, such as the internet, it may be impossible to guarantee the integrity of physical communication lines between nodes. Transient communication failures can lock client processes, wasting resources and hampering the overall performance of the system.

Therefore a need exists for a reliable method for managing communications between nodes of a distributed message passing operating system that may improve the reliability of processing during transient communication failures and rapid node reboots, improve the performance of data transmission through an adaptive protocol that adapts to link flexibility and/or abstracts media selection to allow various policies to be implemented over arbitrary combinations of communication links.

SUMMARY

A method of managing communications in a distributed operating system to overcome transmission performance limitations dictated by an inability to (1) reliably handle transient communication failures and rapid node reboots, (2) provide a transmission protocol that adapts to link reliability, and (3) allow transmissions to occur over an arbitrary combination of media is disclosed. The systems and methods described herein provide a reliable node-to-node session protocol that offers high performance message delivery and multi-interface management and support. This is done by transmitting all data between two nodes of the operating system over a single connection that may dynamically exploit multiple interfaces between the nodes. Various media selection policies also may be implemented to allow a user to specify interfaces for a particular data transmission.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
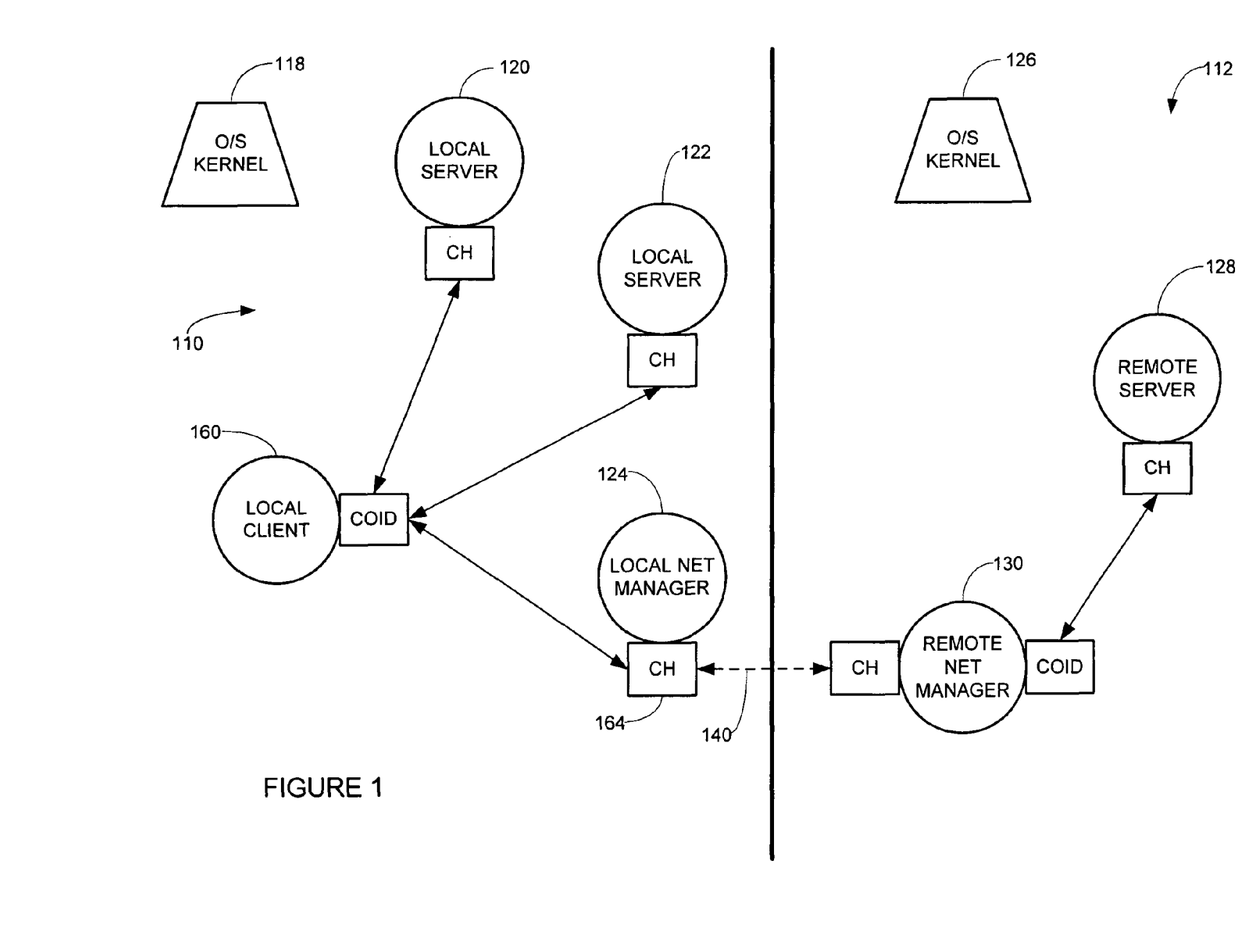
FIG. 1 depicts is an exemplary physical layout for implementing a distributed operating system.

An exemplary physical layout for implementing a distributed operating system is shown in FIG. 1. The layout includes a local computer system 110 and a remote computer system 112, interconnected via a communication network 140. Although the local computer system 110 and remote computer system 112 are described as having certain qualities, the physical arrangement and electronic components of the systems are presented only as an example with which to describe the invention. Similarly, the communication network 140 that allows message passing between the two computer systems 110 and 112, also may take on many physical forms and various communication protocols. As the data being passed between the two computer systems 110 and 112 are messages, it is independent of the media used to communicate. Therefore, the type of communication network has little bearing on the invention.

The local computer system 110 of FIG. 1 includes a local client processor 160 that may execute application programs. The local client processor 160 is able to communicate with the other devices in its local area via a local area network, which may be implemented in a manner known in the art. These local devices may include a local message passing operating system 118, one or more local servers 120 and 122, and a local network manager 124.

The local message passing operating system 118 and local network manager 124 may be software programs that generally are stored in an executable form on a computer readable medium such as a random access memory (RAM), read only memory (ROM), optical disk (CD-ROM) or magnetic storage medium (hard drive or portable diskette). The local operating system 118 and local network manager 124 also may be implemented by hardware or other means known in the art.

The local message passing operating system 118 may be accessible to each of the local processors 160, 120 and 122. In addition to message passing as a means of interprocess control, the operating system generally provides such capabilities as data input and output, and timing services, which may be provided via external subroutines stored on similar memory media. The message passing operating system handles communication between each of the processors 160, 120 and 122, and the local network manager 124 by setting up communication channels and connections between them.

The remote computer system 112 has a similar arrangement, including a message passing operating system kernel 126, a remote server 128, and a remote network manager 130. In this arrangement, the three devices shown, the message passing operating system kernel 126, remote server 128, and remote network manager 130, may communicate messages between one another via a message passing network 132, while the remote network manager 130 may communicate with the local network manager 124 via the communication network 140. The components of this remote network 112 will have similar features to the corresponding components in the local network 110.

Similar to the local network 110, the arrangement of the remote network 112 is intended only as an example with which to describe the invention. Clearly, an infinite number of arrangements may be created, which would be known to one skilled in the art. At one end of the spectrum, a network could comprise two processors on a single circuit board, interconnected so that they could communicate with one another. Or, a network could comprise thousands of processors located around the world, interconnected over various types of communication links. The term "remote" is used to mean apart; it is not meant to convey any spatial or distance information.

The distributed operating system handles message passing from the local client processor 160 to the remote server 128 in two stages. The client side 110 essentially treats the local network manager 124 as an artificial server to the local client processor 160. Similarly, the remote network manager 130 generates virtual messages that it passes to the remote server 128; the remote network manager 130 acts like a client to the remote server 128.

The local and remote operating systems 118 and 126 are known in the art as message passing operating systems. For example, message passing may provide interprocess control (IPC) throughout the entire system. In general, a message is a packet of bytes passed from one process to another with no special meaning attached to the content of the message. The data in a message has meaning for the sender of the message and for its receiver, but for no one else.

Message passing not only allows processes to pass data to each other, but also provides a means of synchronizing the execution of several processes. As they send, receive, and reply to messages, processes undergo various "changes of state" that affect when and for how long, they may run. Knowing their states and priorities, the operating systems 118 and 126, can schedule all processes as efficiently as possible to optimize the available processor resources.

On the client side, computer system 110, the application running on the local client 160 knows the off-node address of the remote server 128. The local kernel operating system 118 can recognize any message as an off-node message when it does not have a corresponding local mapping for the node identification. The operating system 118 may consider unrecognized messages to be off-node, and may direct such messages to local client's 160 connection to the local network manager 124 that operates including threads and processes, both of which are known in the art. A thread is a conveniently sized collection of programming steps that are scheduled and executed as a group. A process, on the other hand, can be thought of as a "container" for threads, defining the address space within which threads will execute. A process contains at least one thread.

Message passing is directed towards channels 164 and connections, rather than targeted directly from thread to thread. A thread that wishes to receive messages first creates a channel 164, and another thread that wishes to send a message to that thread must first make a connection to that channel 164 by "attaching" to the channel. Various means of implementing the transmission of the message between the local client processor 160 and the local network manager 124 are known to one skilled in the art, and the invention is not limited to the transmissions via the channels and connections discussed herein.

Channels 164 are implemented by the message kernel calls and are used by servers to receive messages. Connections created by client threads "connect" to the channels made available by servers. Once connections are established, clients can send messages over the connection. If a number of threads in a process attach to the same channel 164, then a single connection may be shared between the threads. Channels 164 and connections may be named within a process by a small integer identifier. Client connections may map directly into file descriptors.

A channel 164 may have three queues associated with it: one for threads waiting for messages, one for threads that have sent a message that have not yet been received, and one for threads that have sent a message that has been received, but not yet replied to. While in any of these queues, the waiting thread is blocked. In other applications, a channel 164 may be arranged in a different manner.

Figure 2:
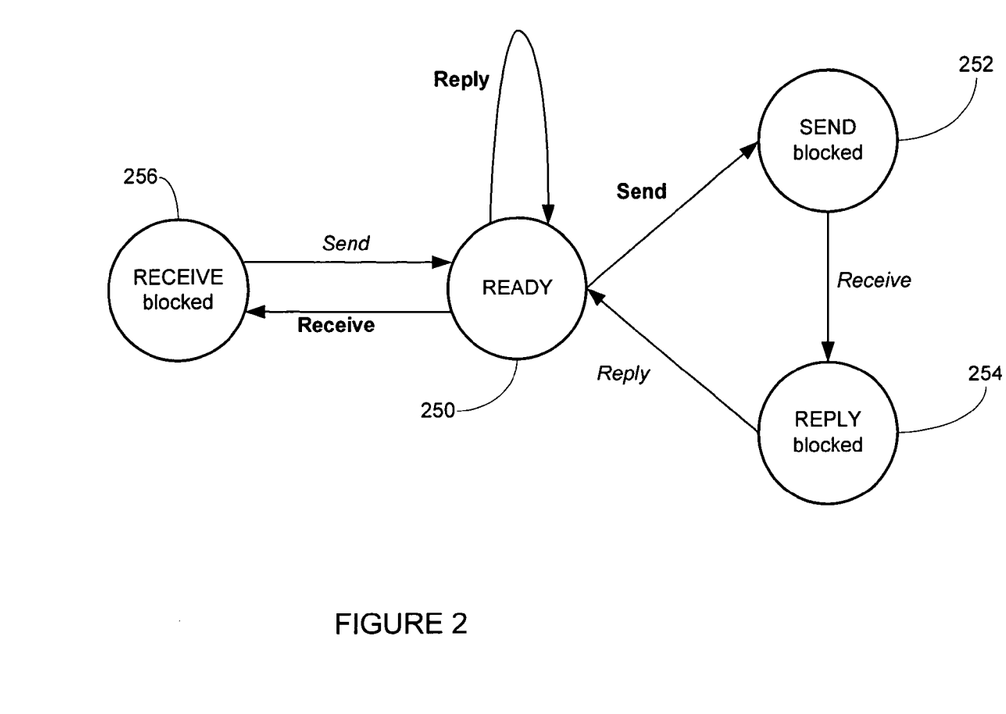
FIG. 2 depicts is an exemplary message blocking scheme for a distributed operating system.

This message blocking generally follows the state diagram of FIG. 2. In FIG. 2, functions or messages in bold originate with a first thread and functions or messages in italics originate in a target thread. Also, a process is said to be blocked if the process isn't allowed to continue executing because it must wait for some part of the message protocol to end. Although reference is made to specific Portable Operating System Interface for UNIX (POSIX) function calls, this is not intended to limit the scope of the claims in any manner. A thread that may transmit message to a target thread by calling a MsgSendv( ) function and moving from the Ready State 250 to the Send Blocked State 252 until the target thread transmits a message back using a MsgReceive( ) function. This puts the originating thread into a Reply Blocked State 254. When the target thread has processed the message, it transmits a reply message back to the originating thread using a MsgReplyv( ) function, and returns to the Ready State 250. If a thread executes a MsgReceivev( ) function call without a previously sent message pending, it will be Receive Blocked 256 until the target thread calls a MsgSendv( ) function to pass a message back to the originating thread. This blocking maintains the synchronized execution of the threads.

While this blocking scheme ensures processing synchronization, problems may occur if there is a temporary failure in the communication network 140 during which a remote network manager 130 attempts to transmit a reply to a local network manager 124. If the outage persists for a sufficient duration, the transport layer will eventually stop trying to transmit the reply. Because the remote network manager 130 cannot communicate to the local network manager 124 that the reply failed to be delivered, the local client 160 will remain reply-blocked forever. It should be noted that the reply-blocking problem may occur regardless of the underlying communication error. For example, the communication outage may be triggered by a rapid reboot of the server node, buffer overruns, physical disconnection from the network, and the like.

Figure 3:
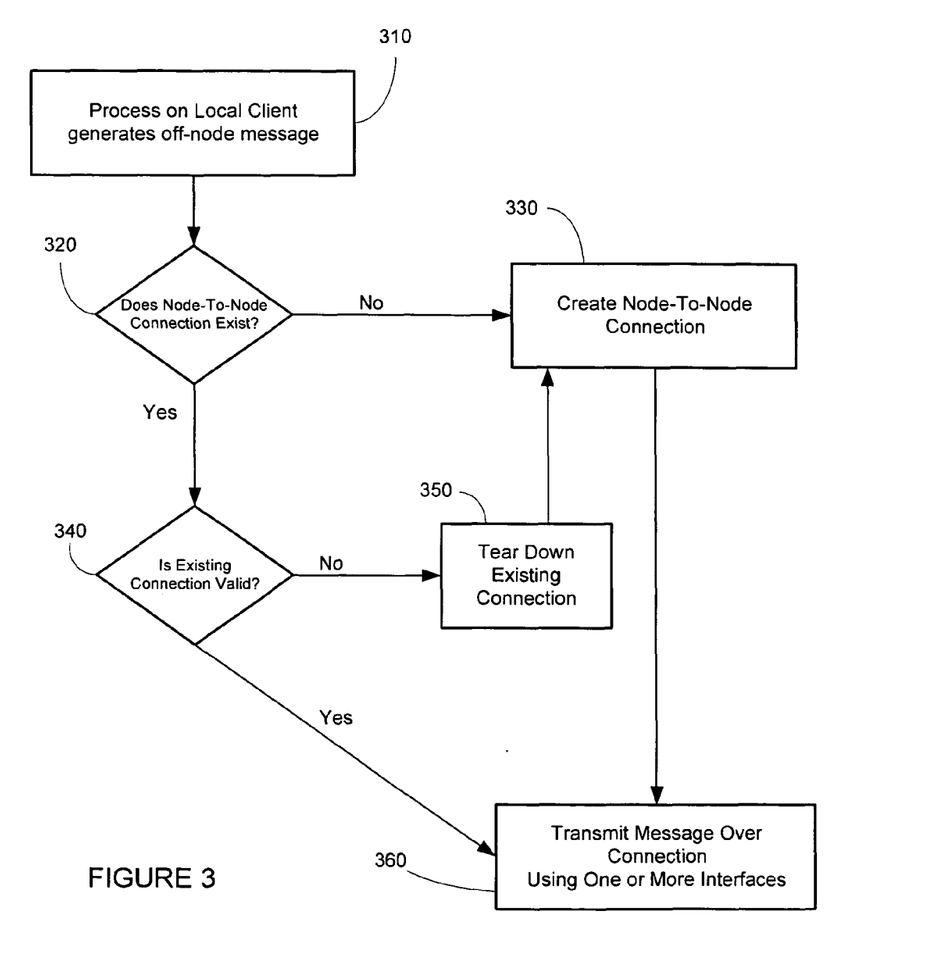
FIG. 3 depicts an exemplary method for managing node-to-node communications in a distributed operating system.

The flow chart in FIG. 3 discloses a method that addresses these concerns. A processor at a local node may generate a message having a remote node destination; the message may be forwarded to the local network manager 124 at step 310. In response, the local network manager 124 may determine if a node-to-node connection exists for the remote node at step 320. If a connection does not exist, the local network manager 124 may create a connection to the remote node at step 330. If a connection is present between the local node and the remote node, the local network manager 124 may determine if the connection is valid at step 340. If the connection is no longer valid, the local network manager 124 may tear down the invalid connection at step 350 and create a new connection at step 330. Once it has been determined that a valid connection exists between the local node and the remote node, or if a new connection is created, the local network manager 124 may transmit the message to the remote network manager 130 over one or more interfaces at step 360.

The term "transmission" has been used to describe the transfer of a message from one device to another. The term is used generally and to prevent confusion with the message types "send" and "receive." Also, and as noted above, the communication network 14 between the local and remote network managers 124 and 130 may take a number of forms as known in the art, as only a message need be communicated. For example, the transmission of 360 may be implemented using a TCP/IP protocol network.

Figure 4:
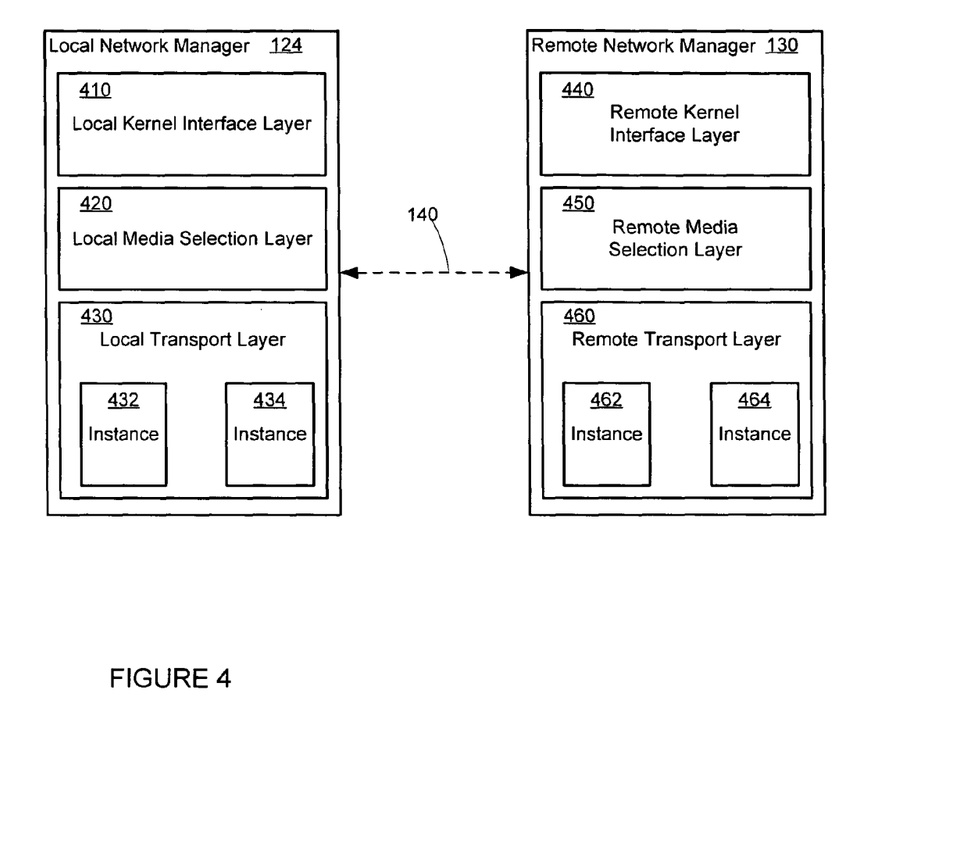
FIG. 4 depicts an exemplary logical architecture of network managers used for node-to-node communications in a distributed operating system.

To implement the method outlined in FIG. 3, the local network manager 124 may include a local kernel interface layer 410, a local media selection layer 420, and a local transport layer 430 as shown in FIG. 4. The local kernel interface layer 410 may be responsible for interacting with the message passing operating system 118 kernel. The local transport layer 430 may include an instance 432 and an instance 434 for each network interface for the local computer system 110. Each instance may be responsible for transmitting data across its associated interface. The local media selection layer 420 may be responsible for managing node-to-node connections and managing the transmission of messages over the transport layer instances 432 and 434.

The remote network manager 130 may have a similar arrangement, including a remote kernel interface layer 440, a remote media selection 450 layer, and a remote transport layer 460 that may include an instance 462 and an instance 464 for each network interface. These remote layers 440, 450 and 460 may perform corresponding functions on the remote computer system 112 as the corresponding local layers 410, 420 and 430 of the local computer system 110. Although the functionalities described herein are described as corresponding to particular layers of the local network manager 124 and the remote network manager 130, these functionalities may be provided in a nearly infinite number of ways using known techniques.

As described above, initially a local node may generate a transmit request to a remote node. The transmit request may be treated as an array of bytes of arbitrary length, and may include a node descriptor corresponding to the remote node. Transmit requests may be received by the local network manager 124, for example, by the local kernel interface layer 410. The local kernel interface layer 410 may then pass the request to the local media selection layer 420 which may determine if a node-to-node connection exists for the remote node and create a new node-to-node connection if none exists. The local media selection layer 420 may maintain a transmit connection structure for each remote node of the system. The transmit connection structures may be used to control state information and the like for the connection between the local and remote nodes, and may be stored internal to the local media selection layer 420. The transmit connection structures may be maintained in a link list indexed by node descriptor so that the local media selection layer 420 may quickly determine if a transmit connection structure exists for the remote node referenced in the request. Alternatively, other data structures, such as hashed linked lists and the like, may be used to maintain the transmit connection structures.

The transmit connection structure may include components corresponding to a connection state, a pair of node descriptors, a pair of connection identifiers, and head and tail pointers. Other components may be added or substituted. The connection state component may comprise a data structure that defines the state of the connection. For example, a connection may have one of multiple states corresponding to packets used to establish the node-to-node connection, described in more detail below. The pair of node descriptors may correspond to node descriptors for the local and remote nodes. For example, the pair may include the local node's node descriptor for the remote node and the remote node's node descriptor for the local node. Exemplary data fields of a transmit connection structure are shown in Table 1.0.

TABLE 1.0

Exemplary Transmit Connection Structure Data Fields

| | |
|---|---|
| struct tx_conn *next | A pointer to the next structure in the linked list |
| struct tx_status status | Status of the connection establishment process with the remote node |
| unsigned short my_nd_4_rem | Local node descriptor for the remote node |
| unsigned short rem_nd_4_me | Remote node descriptor for the local node |
| unsigned long my_conn_id | Locally generated connection identifier |
| unsigned long remote_conn_id | Remotely generated connection identifier |
| unsigned long seq_num | Locally generated transmission sequence number for a particular transmission |
| int txinprog | Flag used to denote that a transmission is currently underway (may be used to enforce in order transmissions per node) |
| struct tx_q *head | Pointer to the first transmission request |
| struct tx_q *tail | Pointer to the last transmission request |

The pair of connection identifiers may be identifiers used for connection management as described below. The pair of connection identifiers may be monotonically increasing counters generated by the media selection layers 420 and 450 to uniquely identify a connection between two nodes such that each connection may have a unique node descriptor and connection identifier pair. The connection identifiers may be generated when the local media selection layer 420 creates a transmit connection structure. Alternatively, the connection identifiers may be generated in any known manner. For example, the connection identifiers may be based on the boot date and/or time of the local and remote computer system 110 and 112, respectively.

The head and tail pointers may define a linked list of transmit requests for the connection to ensure in-order transmission of transmit requests for each node. Alternatively, other known techniques may be used to implement in-order transmission of transmit requests for each node. When creating a new transmit connection structure, the head and tail pointers may point to the initial transmit request, queuing the request even before the connection is established to guarantee that the initial transmit request will be serviced first. An exemplary transmit request is shown below in Table 2.0.

Once a transmit connection structure has been identified or created, connection management packets are transmitted between the local node and the remote node to establish the node-to-node connection. The connection management packets types may correspond to the state of a connection, and may include the pair of node descriptors and pair of connection identifiers used to uniquely identify a connection. Example connection management packets may include TCS_INIT packets sent by a local node for initiating a connection, TCS_REM_UP packets sent by the remote node to indicate that a connection has been established, TCS_UP packets sent by the local node for polling an active connection, and TCS_DOWN and TCS_REM_DOWN packets sent by the local and remote node, respectively, to tear down an existing connection. Connections may be one-way connections that only allow the local or initiator node to transmit data packets over the connection; although connection management packets may be transmitted by either the local or remote node. Accordingly, a connection may only have a state of TCS_INIT or TCS_UP.

Figure 5:
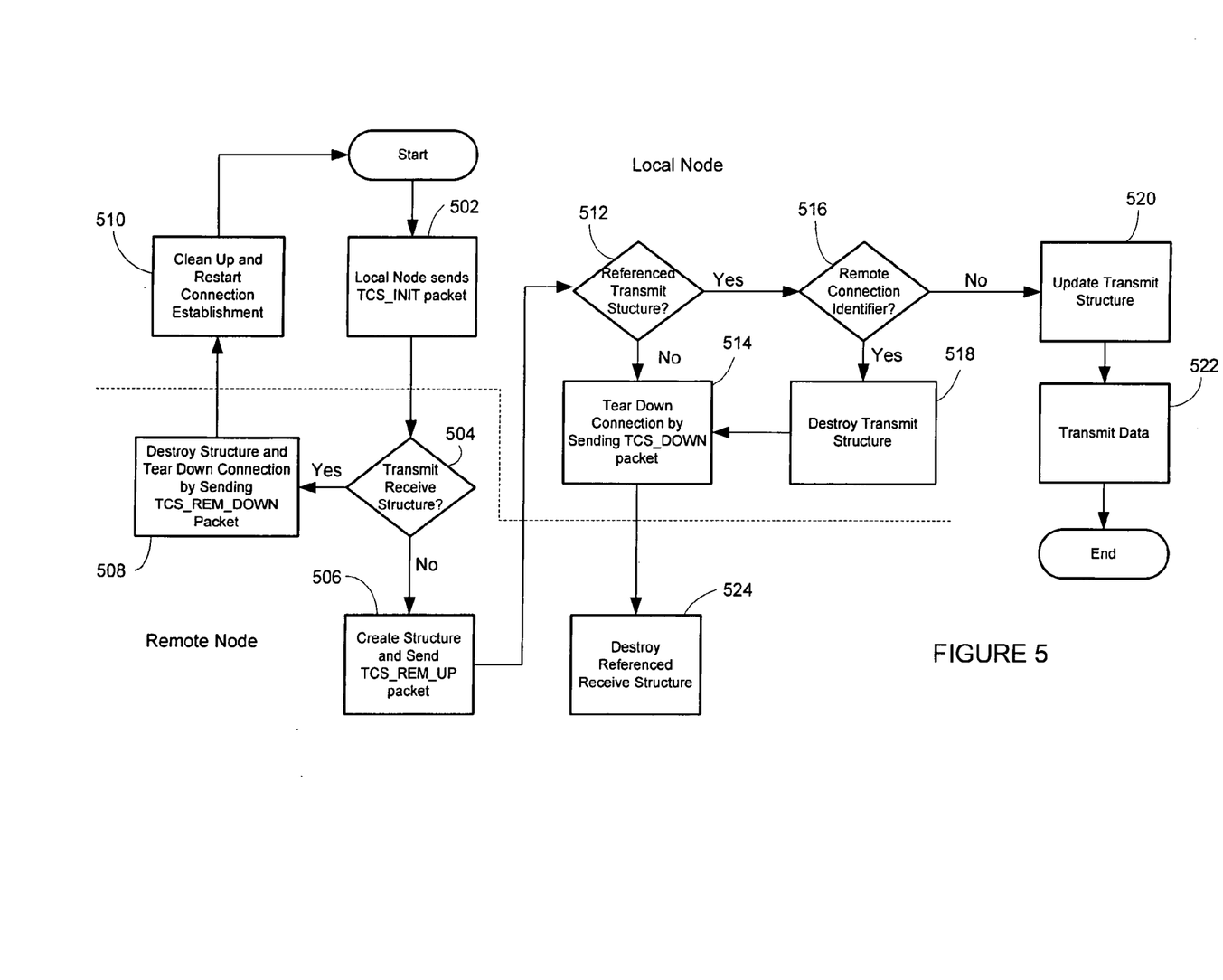
FIG. 5 depicts an exemplary method for establishing a node-to-node connection between nodes of a distributed operating system.

An exemplary flow chart depicting typical connection management packet flows is shown in FIG. 5. A connection may begin in a TCS_INIT state which signifies that the connection between the local and remote nodes is being established. While the connection is in the TCS_INIT state, a TCS_INIT packet may be transmitted from the local node to the remote node at step 502. The TCS_INIT packet may include the local node's node descriptor for the remote node as well as the local node's connection identifier. An exemplary TCS_INIT packet may include a local connection identifier having a value of 4.

Upon receipt of the TCS_INIT packet, the remote node may determine if a transmit receive structure exists for the local node and connection referenced in the TCS_INIT packet at step 504. The transmit receive structure may include similar elements as a transmit connection structure except that it may be indexed by the node descriptor included in the TCS_INIT packet. If no transmit receive structure exist for the local node, which should normally be the case, the remote node may create a transmit receive structure and transmit a TCS_REM_UP packet back to the local node at step 506. The TCS_REM_UP packet may include the node descriptor and connection identifier from the TCS_INIT packet as well as the remote node's node descriptor for the local node and the remote node's connection identifier. Thus, a TCS_REM_UP packet includes complete pairs of node descriptor's and connection identifiers. An exemplary TCS_REM_UP packet may include a connection identifier pair having values of 4 and 3.

In response to the TCS_REM_UP packet, the local node may determine if a transmit connection structure corresponding to the node descriptor and connection identifier pair exists at step 512. If the referenced structure exists, the local node may determine if the remote connection identifier field of the existing structure is empty at step 516. If the value is empty, the local node may update the referenced transmit connection structure with the new node descriptor and connection identifier at step 520. For example, the transmit connection structure may be updated to include connection identifiers 4 and 3. At this point, a connection may be considered established and the connection has a state of TCS_UP. The local node may transmit data packets over the connection at step 522. Similarly, the remote node may receive data packets over the connection. Either node may then tear down the connection at any point by transmitting a TCS_DOWN or TCS_REM_DOWN packet.

In certain situations, errors may occur in the connection management process. For example, a transmit receive structure may already exist for node descriptor referenced in the TCS_INIT packet. If the remote node already has a pre-existing transmit receive structure, two cases are possible. First, the existing transmit receive structure may have the same connection identifier as the TCS_INIT packet. The remote node may have a pre-existing transmit receive structure including a matching connection identifier for several reasons. For example, a duplicate TCS_INIT could be generated by the local node or somewhere else on the communication network 140. Alternatively, the local node may have been rebooted and have no knowledge (i.e., state information) of the existing node-to-node connection but nonetheless has regenerated the same connection identifier as the old connection. Alternatively, the pre-existing structure may include a non-matching connection identifier which again indicates that the connection is out of sync.

If a pre-existing transmit receive structure exists, the remote node may tear down the existing connection regardless of the cause of the problem by transmitting a TCS_REM_DOWN packet at step 508. The TCS_REM_DOWN packet may include either a single node descriptor and connection identifier and is treated by the local node as a command to tear down the referenced connection. The local node may tear down a connection, for example, by deleting its transmit connection structure for the connection and cleaning up any other state information associated with the connection at step 510. The local node may then attempt to reestablish the connection. Alternatively, the connection identifier may be used to determine the cause of the problem. If the cause of the problem is harmless, for example, if the TCS_INIT packet is a duplicate packet, the pre-existing connection may be used for data transmission.

Similar errors may also occur when a TCS_REM_UP packet is received by the local node. As described above, the TCS_REM_UP packet includes complete pairs of node descriptors and connection identifier, i.e., the local node's pair and the remote node's pair. If the local node does not have a transmit connection structure corresponding to the referenced local node descriptor and connection identifier pair, the nodes are out of sync and a TCS_DOWN packet may be transmitted to the remote node to close the connection at step 514. In response to the TCS_DOWN packet, the remote node may destroy the referenced transmit receive structure, clean up any remaining state information, and the like at step 524. Alternatively, the local node may have an existing transmit connection structure for the remote node. In the normal case described above, the local node's transmit connection structure may not include a remote node descriptor and connection identifier, or those components may be set to default values, such as 0. However, due to duplicate packets or reboots, the transmit connection structure may include values for the remote node descriptor and connection identifier pair. In this case, the local node may destroy the existing transmit connection structure at step 518 and tear down the connection by transmitting a TCS_DOWN packet at step 514. Alternatively, if the cause of the error is determined to be harmless, the pre-existing connection may be updated and used for data transmission.

After a connection has been established, transmit requests may be serviced by the local network manager 124, for example, by establishing user-level connections and transmitting data over the user-level connections, as described above. Transmit requests for a particular node may be serviced in order by the local network manager. This may be accomplished, for example, by queuing transmit requests for a particular connection using the head and tail pointers described above. An exemplary structure for queuing transmission requests is shown in Table 2.0. Additionally, a transmit request identifier may be generated that is unique to the node, such as a monotonically increasing counter. Alternatively, the transmit request identifier may be generated using any number of known manners. Transmit request identifiers may be generated, for example, by the local media selection layer 420. As describe above, transmit requests may be treated as arrays of bytes of arbitrary length. Implementing transmit request identifiers allows all user data to be generally handled as a two-dimension array of bytes indexed by transmit request identifiers and offsets.

TABLE 2.0

Exemplary Transmission Request Queue Data Fields

| | |
|---|---|
| struct tx_q *next | A pointer to the next transmission in the singly-linked list |
| int qos_pkt | A flag used to denote that the packet is a media selection layer packet, or alternatively, user data |
| 14_bits tried_14 | List of transport layer instances which have already been tried |
| void *tx_conn | A pointer to the media selection layer's connection structure |
| struct qos_info qos_info | Media selection information |
| struct sockaddr raddr | The destination physical address for the remote node transport layer |
| struct 14_request 14_req | Structure used to denote the particulars of a transmit request (See Table 3.0) |

TABLE 3.0

Exemplary Transmit Request Data Fields

| | |
|---|---|
| unsigned layer | Used to denote the layer to be called on the receiving node to properly handle the message |
| unsigned nd | Node descriptor |
| void *data | Transport layer header information |
| unsigned data_len | Length of transport layer header information |
| int rcvid | The identifier of the location of the data to be sent |
| unsigned offset | Offset used to denote the location of data to be sent |
| unsigned rcvid_len | Length of data to be sent |
| void (*rcvid_done) (int handle, int status) | Function call used after all data to be sent has been acquired |
| int handle | Denotes handler function used to |
| int status | Status of the transmission |
| void **sequence | Used to tell the transport layer to sequence multiple requests |

The relationship between two nodes having a node-to-node connection may be characterized in three ways. First, the nodes may have user-level processes actively communicating. Second, the nodes may have active user-level connections, but are not currently transmitting data. Third, no user-level connections may exist between processes on the nodes. In either of the first two cases, the media selection layer 420 may retain the node-to-node connection. In the third case, however, the media selection layer 420 may tear down the node-to-node connection, for example, if communications have ceased for predefined time. Alternatively, or additionally, other known methods for timing out a connection may be used.

Where more than one interface exists between the local and remote nodes, the local media selection layer 420 also may be responsible for managing the transmission of data packets over the multiple interfaces, such as by maintaining a pool of interfaces, networks and the like. The pool may include only those interfaces or networks which are operational or available, or the pool may include any interface or network. One exemplary method of managing transmissions over multiple network interfaces is shown in the flow chart of FIG. 6. Initially, the media selection layer 420 may determine a media selection preference at step 602. The media selection preference indicates a policy for how the media selection layer 420 transmits the data over the connection. The media selection preference may be specified as part of the pathname of a device. For example, the pathname "/net/lab2~exclusive:en0/dev/ser1" may be used to access a serial device on a node named "lab2" with a media selection policy of "exclusive."

Optionally, symbolic links may be created to various media selection qualified path names. Alternatively, or additionally, media selection policies may be defined via a command separate from the pathname.

Figure 6:
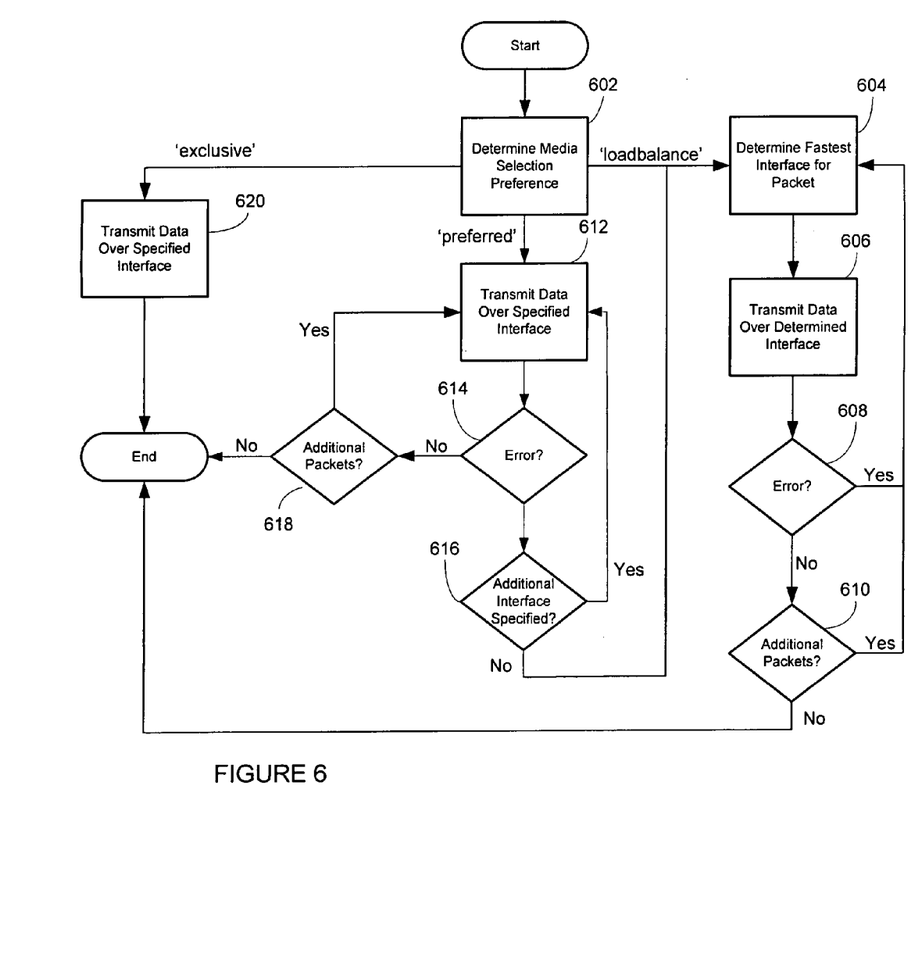
FIG. 6 depicts an exemplary method for method of managing transmissions over multiple network interfaces in a distributed operating system.

As shown in FIG. 6, data may be transmitted according to three different policies: (1) a "loadbalance" policy 603, (2) a "preferred" policy 611, and (3) an "exclusive" policy 619. One of ordinary skill in the art will appreciate that various additional media selection policies may be implemented. For example, a "redundant" media selection policy may be provided that allows a user to transmit data packets simultaneously over multiple interfaces.

The "loadbalance" policy 603 allows the local media selection layer 420 to determine which network interface, or transport layer instance 432 and 434, to transmit data over for each packet. Each packet may be queued on the link that can deliver the packet to the remote node fastest. This effectively provides greater bandwidth between nodes when multiple links are available (the bandwidth may be the sum of the bandwidths of available links) as well as graceful degradation of service as links become unavailable. Accordingly, the local media selection layer 420 may determine the fastest interface 432 and 434 at step 604. The packet may then be transmitted over the determined interface 432 and 434 at step 606. If an error occurs, the local media selection layer may attempt to resend the packet over the next fastest interface. Additionally, the local media selection layer 420 may not attempt to send future packets across the failed interface. The local media selection layer 420 may continue this process for any additional packets at step 610 until the data has been transmitted.

The "preferred" media selection policy 611 allows the user to specify a particular network interface that should be used if it is available. Accordingly, the local media selection layer 420 may attempt to transmit data over the specified interface at step 612, looping at step 618 to transmit additional packets. If the interface becomes unavailable during the transmission (i.e., an error occurs in the transmission) at step 614, the media selection layer 420 may then select another interface 432 and 434 for transmitting the data. For example, the local media selection layer 420 may revert to a default media selection policy. Alternatively, the local media selection layer 420 may select the interface most similar to the preferred link. Multiple preferred interfaces may also be specified so that the media selection layer 420 may attempt to transmit packets over the first interface if available, then the second interface, and so on. Multiple preferences may be specified, for example, by setting a relative performance value of the link. The relative performance value may be based on the performance characteristics of the network, such as maximum bandwidth, average bandwidth, availability of the network, and the like. As shown in FIG. 6, the local media selection layer 420 may attempt to determine if additional preferred interfaces have been specified at step 616. If an additional interface has been specified, the transmission may be attempted over the additional interface. If no additional interface has been specified, the local media selection layer 420 may attempt the transmission in accordance with a default media selection policy, for example, the 'loadbalance' policy 603. Alternatively or additionally, policies may be combined so that the media selection layer 420 may effectively "loadbalance" 603 transmission over multiple "preferred" 611 links.

Finally, the "exclusive" media selection preference 619 may allow a user to lock transmission to a specific link. In the event that the "exclusive" link becomes unavailable, the local network manager 124 may not attempt to transmit the data over any other interfaces. Alternatively, multiple "exclusive" 619 interfaces may be specified such that the media selection layer 420 may transmit information only across the specified interfaces. The "exclusive" media selection policy may be used, for example, when an application that moves large amounts of data requires high bandwidth interfaces. Using the "exclusive" media selection policy, the user can limit transmission to only those interface meeting the application's requirements and avoid overloading lower bandwidth interfaces under failure conditions. Again, the policies may be combined so that the media selection layer 420 may "loadbalance" 603 transmission over several "exclusive" 619 interfaces. Referring again to FIG. 6, the local media selection layer 420 may transmit data packets over the exclusive interface at step 620. If the specified interface fails, the transmission is not attempted over any additional interfaces.

In order to implement this exemplary media selection method, the local media selection layer 430 may maintain a pool of available interfaces or networks. For example, each transport layer instance 432 and 434 may notify the media selection layer of when its associated interface is down. The media selection layer 430 may then periodically poll the interface to determine when it is again functioning properly. For example, TCS_UP packets including the node descriptor and connection identifier pairs described above may be transmitted across the unavailable interfaces periodically. In response, the remote media selection layer 450 may transmit TCS_REM_UP packets to confirm that the link is once again available.

The local media selection layer 420 also may acquire performance information from the local transport layer 430. This performance information then may be used to select interfaces in accordance with the specified media selection preference. For example, each transport layer instance 432 and 434 may include static and dynamic performance information. Each instance may maintain static performance information such as hardware capabilities and the like. Exemplary dynamic performance information may include byte counts, counts of the currently queued transmission requests and the sizes of those requests, and the like.

Figure 7:
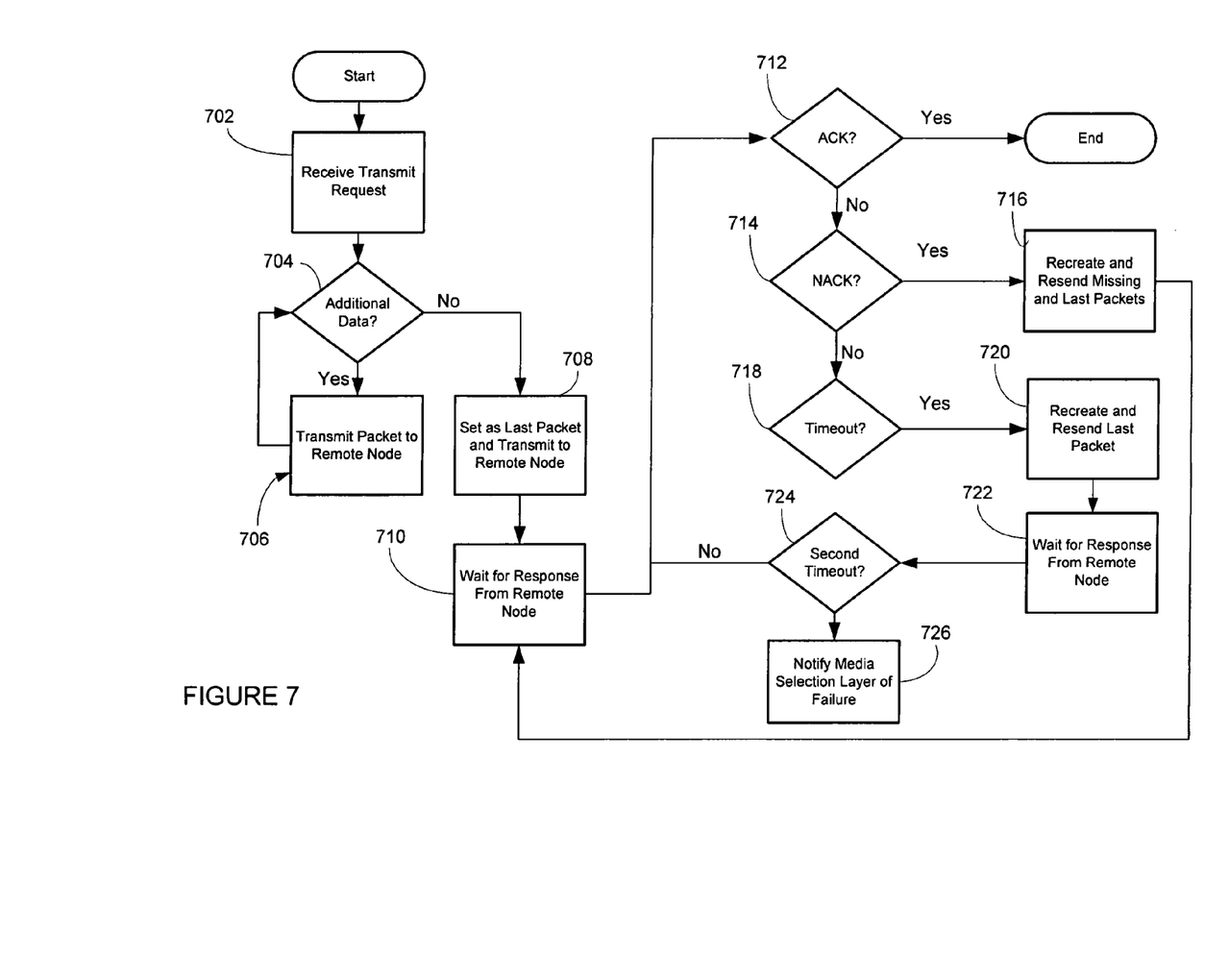
FIG. 7 depicts an exemplary method for transmitting data from a local node in a distributed operating system.

After the appropriate interface is selected by the media selection layer 420, data packets may be transmitted by the local transport layer 430 to the remote transport layer 460. A flow chart depicting an exemplary data transmission by the local transport layer 430 is shown in FIG. 7. After receiving a transmission request at step 702, the local transport layer 430 may verify the length of the transmission at step 704. If additional packets are to be transmitted, the local transport layer may transmit the packet to the remote node at step 706. The local transport layer 430 may transmit the packet, for example, by allocating a buffer, packing it with data from the request and making the appropriate call to the interface driver. The local transport layer 430 may also append the node descriptor and session layer, or node-to-node, connection identifier pairs to each data packet. Exemplary packet data fields are shown in Table 4.0, and exemplary media selection layer information to be included in a packet is shown in Table 5.0. Next, the local transport layer 430 may loop to transmit the remaining data. When no additional information is to be transmitted, the local transport layer 430 may mark the last packet of a transmission at step 708, for example by a flag set in the packet header, so that the remote node may be notified that the transmission is complete. After all the data has been transmitted, the local transport layer 430 may wait for a response from the receiving node at step 710.

TABLE 4.0

Exemplary Packet Data Fields

| | |
|---|---|
| unsigned char version | Transport Layer version information |
| unsigned char type | Payload type |
| unsigned char flags | Flags used to denote the start and end of a transmission |
| unsigned char layer | Used to denote the layer to be called on the receiving node to properly handle the message (See Table 5.0) |
| struct qos_info qos_info | Media Selection Layer header information |
| unsigned long offset | Offset of individual packet into entire byte stream sequence |
| unsigned long length | Number of bytes |
| unsigned long crc | 32-bit header and payload |
| unsigned char data[] | Payload |

TABLE 5.0

Exemplary Media Selection Layer Information

| | |
|---|---|
| unsigned short src_nd_4_dst | The local node descriptor for the remote node |
| unsigned short dst_nd_4_src | The remote node descriptor for the local node |
| unsigned long src_conn_id | Locally generated connection identifier |
| unsigned long dst_conn_id | Remotely generated connection identifier |
| unsigned long src_seq_num | Sequence number denoting the transmission request to which the current packet belongs |
| unsigned long qos_type | Media selection layer information used to reconstruct media selection on the remote node |

Figure 8:
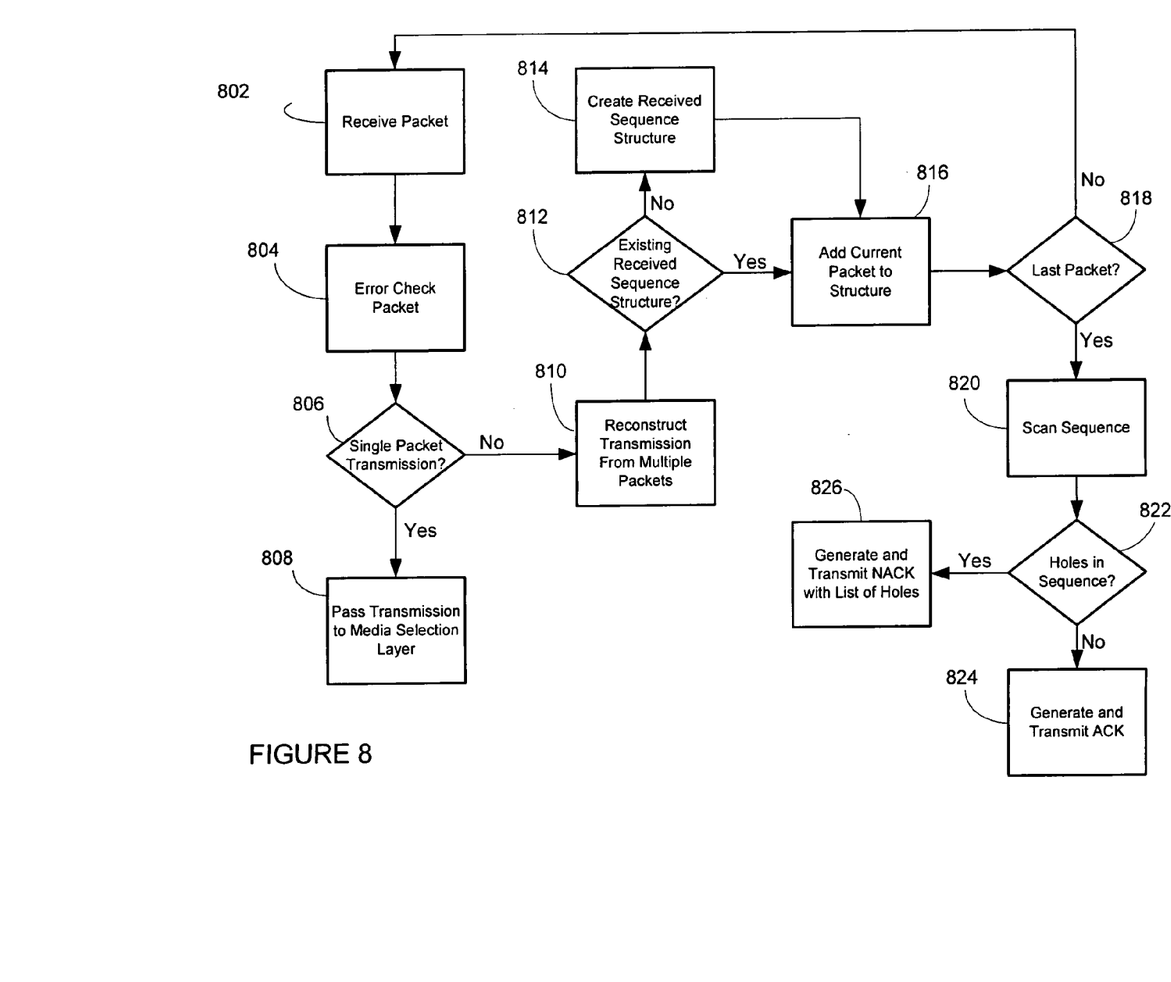
FIG. 8 depicts an exemplary method for receiving data at a remote node in a distributed operating system.

A flow chart depicting an exemplary data reception by the remote transport layer 460 is shown in FIG. 8. Initially, a packet is received by a device driver on the remote node and passed to the remote transport layer 460 of the remote network manager 130 at step 802. The received packet may include elements that define pointers to the next packet in the transmission, the packet length, header and data buffers, a physical address, and the like. Exemplary data fields for a received packet are shown in Table 6.0. Optionally, error checking as known in the art may be performed to validate the packet at step 804. Other elements may be substituted or added.

TABLE 6.0

Exemplary Received Packet Data Fields

| | |
|---|---|
| struct rx_pkt *next | Pointer to the next received packet in the sequence |
| int total_length | Length of header and data |
| struct l4_pkt *hdr | Allocated transport layer packet header buffer |
| char *data | Allocated user data buffer |
| struct sockaddr raddr | The physical address of the local node |

The remote transport layer 460 may continue to receive packets until an entire transmission has been received. The entire transmission may then be passed to the remote media selection layer 450 at step 808 which either performs media connection services or forward user data to the appropriate destination as the case may be. Accordingly, the remote transport layer 460 may determine if the transmission is a single packet transmission at step 806. Single packet transmissions, such as connection management packet and small user data transmissions, may be passed directly to the remote media selection layer 450 for further processing at step 808. A transmission may be designated a single packet transmission by setting both start and end flags in a packet's header. In general, transmissions may be passed to the remote media selection layer 450, for example, by adding the transmission to a queue of received transmissions. The queue may be implemented, for example, as an array of pointers to linked lists of received sequence structures indexed by the bottom X bits of the remote node descriptor. Exemplary data fields of a received packet queue structure are shown in Table 7.0.

TABLE 7.0

Exemplary Received Transmission Queue Data Fields

| | |
|---|---|
| int l4_index | identify the transport layer instance which received this packet |
| int qos_pkt | Flag to signify that this packet is a media selection layer packet or transport layer packet |
| int layer | The function to call to receive the packet |
| struct sockaddr raddr | Local physical address for the remote node's transport layer |
| struct qos_info qos_info | Media Selection layer information for the iov fields below |
| Int niov | Total number of iov in the following array |
| iov_t iov[] | Array of fragments |

If the transmission does include multiple packets, the remote transport layer may reconstruct the transmission at step 810. For example, the transmission may be reconstructed into a received sequence data structure. An exemplary received sequence structure may be implemented as a linked list of received packets for a given node descriptor/connection identifier combination. The received sequence structure also may include elements that define the unique node descriptor and connection identifier for the connection, a physical address, and the like. The remote transport layer 460 may use the connection identifier and sequence number of the received packet may be used to search for a pre-existing received sequence structure at step 812. If needed, a new received sequence structure is allocated and added to the pointer array at step 814, and the received packet then is inserted into the received sequence structure at step 816. The remote transport layer 460 may scan the received sequence structure to insert the packet in sequence, i.e., in order of offset. Alternatively, or additionally, the packet may be inserted into the structure at any location.

Upon receipt of the last packet of a transmission at step 818, as sent by the local network manager 124, the remote transport layer 460 may scan the received sequence structure to verify that the transmission is complete at step 820. The last packet of a transmission may be designated as such via a flag in the header of the packet. If the transmission is complete, the remote transport layer 460 may transmit an ACK packet indicating a successful transfer at step 824. Alternatively, the remote transport layer 460 may transmit a NACK packet indicating that one or more packets of the transmission were lost at step 826. The NACK packet may include a hole list describing the missing packets. An exemplary hole list may be implemented to include the total number of holes in the transmission and a data structure that defines each hole in the list, for example, by describing the hole by an offset and length in the transmission sequence.

Referring again to FIG. 7, the local transport layer 430 waits for a response from the remote transport layer 460 after transmitting the last packet of transmission at step 710. The local transport layer 430 may receive an ACK packet indicating a successful transmission at step 712. In that case, the local transport layer 430 may indicate success to the media selection layer 420. Alternatively, the local transport layer 430 may receive a NACK packet indicating lost packets at step 714. In this case, the referenced packets may be recreated and retransmitted at step 716. If no response if received for a given time at step 718, the local transport layer may recreate and retransmit the last packet of the sequence at step 720 and again wait for a response at step 722. The last packet may trigger the remote node to rescan its received sequence and send an ACK or NACK packet. This may allow the local node to salvage an incomplete transmission in which a communications outage occurred that prevented either the last packet or the response packet to be lost. If the repeated time outs occur at step 724, the local transport layer 430 may so inform the local media selection layer 420 at step 726. In response, the local media selection layer 420 may remove the interface from the pool of available interfaces and periodically poll the interface with polling packets to determine its future availability. Exemplary polling packets may include the TCS_UP packets described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method of managing communication between multiple nodes in a distributed message-passing operating system comprising:
    establishing by a media selection layer, a single node-to-node connection between a local node and a single remote node, the single node-to-node connection associated with a local connection identifier and a remote connection identifier, the local connection identifier associated with the local node and the remote connection identifier associated with the remote node, wherein one or more user-level connections are established for transmission of data over the single node-to-node connection;
    maintaining, at the local node, a pool of available communications networks that interconnect the local node with the single remote node, wherein the pool of available communications networks are utilized for the transmission of the data over the single node-to-node connection and the one or more user-level connections;
    determining if one of the available communication networks has failed;
    removing the failed communication network from the pool;
    transmitting, periodically across the failed communication network, maintenance packets from the local node to the single remote node; and
    determining whether the failed communication network has recovered.

2. The method of claim 1, further comprising:
    adding the recovered communication network to the pool if the failed communication network has recovered.

3. The method of claim 1, wherein the determining if one of the plurality of communication networks has failed further comprises receiving notification that a network driver has died.

4. The method of claim 1, further comprising:
    sharing transmission of a plurality of packets between the local node and the single remote node via networks in the pool of available communication networks.

5. The method of claim 1, further comprising selecting a subset of communication networks from the pool of available communication networks; and
    sharing transmission of a plurality of packets between the local node and the single remote node over networks in the subset of communication networks.

6. The method of claim 5, where the subset of communication networks includes networks with similar performance characteristics.

7. The method of claim 5, further comprising:
    determining, for each of the plurality of packets, a fastest communication network from the subset of communication networks, the fastest communication network capable of transmitting a packet faster than other communication networks in the subset of communication networks; and
    transmitting the corresponding packets over the determined fastest communication networks.

8. The method of claim 1, further comprising:
    designating one of the pool of communications networks as a preferred communication network; and
    transmitting a plurality of packets via any other communication network in the pool if the preferred communication network fails.

9. The method of claim 4, further comprising:
    designating a subset of the pool of communications networks as preferred communication networks; and
    transmitting the plurality of packets via any other communication network in the pool if each of the subset of preferred communication networks fails.

10. The method of claim 1, further comprising:
    designating one of the pool of communications networks as an exclusive communication network; and
    transmitting the plurality of packets over the exclusive communication network.

11. The method of claim 4, further comprising:
    designating a subset of the pool of communications networks as exclusive communication networks; and
    transmitting the plurality of packets only over the subset of exclusive communication networks.

12. The method of claim 1, wherein a media selection layer in the local node manages the pool of available communications networks that interconnect the local node with the single remote node and the media selection layer determines a media selection policy for how data is transmitted from the local node to the single remote node.

13. The method of claim 12, wherein the media selection policy comprises one of a load balance policy, a preferred policy and an exclusive policy.

14. The method of claim 13, wherein the load balance policy enables the media selection layer to determine, for each packet, which of the communication networks to utilize to transmit each packet to the single remote node based on which network can deliver each packet to the single remote node fastest.

* * * * *